United States Patent Office 3,746,561
Patented July 17, 1973

3,746,561
STRIPPABLE COATING COMPOSITIONS
Travis L. Gordy, Ponca City, Okla., assignor to Continental Oil Company, Ponca City, Okla.
No Drawing. Continuation-in-part of application Ser. No. 113,069, Feb. 5, 1971, which is a continuation-in-part of application Ser. No. 888,846, Dec. 29, 1969, both now abandoned. This application Feb. 25, 1972, Ser. No. 229,484
Int. Cl. C08f 45/52
U.S. Cl. 117—6       3 Claims

ABSTRACT OF THE DISCLOSURE

This disclosure concerns compositions which are useful for providing a strippable, protective coating on various substrates (e.g., automobile moldings). The compositions consist essentially of petroleum wax, and a wax-compatible copolymer, which is an ethylene-ethyl acrylate copolymer, a mixture of ethylene-ethyl acrylate copolymers having different melt indexes, or a mixture of ethylene-ethyl acrylate copolymer and ethylene-isobutyl acrylate copolymer. A release agent is not essential to the compositions.

CROSS-REFERENCE TO RELATED APPLICATIONS

The present application is a continuation-in-part of application Ser. No. 113,069, filed Feb. 5, 1971, and now abandoned which in turn was a continuation-in-part of application Ser. No. 888,846, filed Dec. 29, 1969, and now abandoned.

The following copending applications, and patent based on a copending application, of which I am the inventor, concern strippable coatings and compositions which are suitable for use as strippable coatings.

Ser. No. 126,978, filed Mar. 22, 1971, and now Defensive Publication No. T900,017, which is a continuation of Ser. No. 780,260, filed Nov. 29, 1968, and now abandoned, concerns a composition which is useful to provide a strippable, protective coating on various substrates. The composition comprises petroleum wax, ethylene-isobutyl acrylate copolymer, ethylene-vinyl acetate copolymer and a rosin ester.

Ser. No. 129,193, filed Mar. 29, 1971, and now Defensive Publication No. T896,032, which is a continuation of Ser. No. 783,712, filed Dec. 13, 1968, and now abandoned, concerns a substrate having a readily strippable, protective coating of a composition comprising petroleum wax and an ethylene-isobutyl acrylate copolymer.

U.S. Pat. No. 3,620,796, which issued Nov. 16, 1971, being based on application Ser. No. 791,541, filed Jan. 13, 1969, concerns a substrate having a readily strippable, protective coating of a composition comprising petroleum wax and an ethylene-vinyl acetate copolymer containing from 16 to 22 percent vinyl acetate.

BACKGROUND

The present invention concerns compositions which are useful for forming a strippable, protective coating on various articles of manufacture during shipment and other handling prior to the ultimate use of the article. The following description illustrates one use for my invention.

The present-day automobile uses a variety of moldings on the body. Often it is necessary for the owner to have these moldings replaced by the local dealer. The dealer usually has one or more of the moldings in stock, which in turn are obtained from a regional warehouse, where in turn the part is obtained from a general warehouse. It is thus apparent that a single molding may be subjected to three or more handlings before it is finally installed on the automobile. Because of this high amount of handling the molding is subject to damage due to scratching, dropping and other acts. One means of protecting the molding is to provide it with a protective coating which is easily removable, for example, by stripping. In order to be suitable as a strippable coating for this use a composition must meet several requisites, such as the following:

(1) it must be easily applied,
(2) it must have little adhesion to the substrate which is coated,
(3) it must have sufficient cohesive strength so that it is easily removed by pulling—for example, usually, it will come off in a single piece.

Under certain usages, it is desirable that the composition have the following properties:

(1) where the coated article is handled in hotter climates it must provide a continuous film at temperatures up to 150° F.,
(2) where the article to be coated is made of soft material the composition must provide a hard film to protect the surface, or a shock absorbing film to cushion the article against blows from other objects in the normal process of handling and transportation.

More recently, it has become apparent that the compositions should provide a coating which is resistant to creep fracture when under constant stress. (This property is usually referred to as "stress fracture.") To illustrate, one means of coating an automobile molding is to completely encapsulate it by passing the molding through a molten, falling film (or curtain) of a composition, of a type similar to those described herein. As the composition cools and then solidifies it contracts and draws tightly around the molding, thereby establishing a stress within the coating. With time the coating may yield or creep to relieve the stress. In doing so it may or may not fracture. Less desirable coatings, in time, will develop many small cracks which are referred to as stress fracture.

My invention concerns the discovery of specific compositions which are useful as a strippable, protective coating and are particularly resistant to stress fracture. While a release agent can be used in the compositions of my invention such a material is not necessary in order to provide satisfactory strippable coating compositions.

PRIOR ART

Several patents, e.g., U.S. 3,368,989, teach compositions comprising wax and a copolymer of ethylene and a lower acrylate. To my knowledge, however, there are no references which teach that a composition comprising petroleum wax and an ethylene-ethyl acrylate copolymer having a melt index of about 18 to about 25 gives a strippable coating having improved stress fracture properties.

U.S. Pat. No. 3,489,705, which was cited against the parent application (Ser. No. 113,069), teaches strippable coating compositions comprising petroleum wax, a copolymer and an organic amide release agent. Concerning suitable copolymers, the patent teaches that they can be ethylene-vinyl acetate, ethylene-ethyl acrylate, or ethylene-isobutyl acrylate. This patent is not considered pertinent since (1) it teaches that the release agent is a necessary part of the composition, and (2) it does not teach that copolymers having certain critical ethyl acrylate contents or melt index properties give improved results.

Moreover, to my knowledge all of the prior art patents teach that a release agent is a necessary ingredient of strippable coating compositions.

To make this discussion of the prior art complete the following U.S. patents were cited in the related applications discussed hereinbefore: 2,485,248; 3,207,716; 3,377,305; 3,422,551; 3,423,342; 3,427,265; 3,215,657; 3,258,319; 3,429,843; 3,485,784; 3,268,463.

BRIEF SUMMARY OF THE INVENTION

Broadly stated, the present invention concerns compositions which are useful for providing a strippable, protective coating, being particularly resistant to stress fracture, on various substrates. The compositions, which do not contain a release agent, consist essentially of petroleum wax and a wax-compatible copolymer, which is ethylene-ethyl acrylate copolymer, a mixture of ethylene-ethyl acrylate copolymers having different melt indexes, or a mixture of ethylene-ethyl acrylate copolymer and ethylene-isobutyl acrylate copolymer.

More specifically, the present invention has the following aspects:

A composition of matter, said composition of matter not containing a release agent and consisting essentially of petroleum wax and an ethylene-ethyl acrylate copolymer containing from about 15 to about 32 weight percent ethyl acrylate and having a melt index of from about 5 to about 35. Preferably, the ethylene-ethyl acrylate copolymer contains from about 17 to about 19 weight percent ethyl acrylate and has a melt index of from about 18 to about 25.

An article of manufacture comprising a substrate having a strippable coating of the composition described in the immediate foregoing.

A composition of matter, said composition of matter not containing a release agent and consisting essentially of petroleum wax and a mixture of ethylene-ethyl acrylate copolymers, one of said ethylene-ethyl acrylate copolymers having a melt index of from about 18 to about 25, while the second ethylene-ethyl acrylate copolymer has a melt index of from about 5 to about 7, preferably about 6.

An article of manufacture comprising a substrate having a strippable coating of the composition described in the immediate foregoing.

A composition of matter, said composition of matter not containing a release agent and consisting essentially of petroleum wax, ethylene-ethyl acrylate copolymer and ethylene-isobutyl acrylate copolymer; preferably, the ethylene-ethyl acrylate copolymer contains from about 15 to about 32 weight percent ethyl acrylate and has a melt index of from about 18 to about 25.

An article of manufacture comprising a substrate having a strippable coating of the composition described in the immediate foregoing.

DETAILED DESCRIPTION

The term "petroleum wax" as used herein refers to paraffin wax, microcrystalline wax or mixtures thereof.

The term "paraffin wax" is used to define the hard, crystalline wax commonly obtained from petroleum distillates, derived from mineral oils of the mixed-base or paraffin-base type. By the present refining methods, crude petroleum oil is subjected to distillation whereby it is separated into a series of fractions known as "paraffin distillates." The wax is separated from the oil by mixing the paraffin distillate with a solvent (as for example a ketone, such as methyl ethyl ketone) chilling the mixture to solidify the wax and filtering. The wax obtained contains from about 10 to about 25 percent oil and is generally referred to as "slack wax." The oil is separated from the wax by mixing the slack wax with more of the same solvent, and again chilling and filtering. The oil method of sweating oil from wax has been largely replaced by the solvent method. The final product is known as "refined wax" or "paraffin wax" and is graded according to the tensile strength, melting point, oil content, hardness, etc.

The term "microcrystalline wax" refers to a wax material which is obtained usually from the residual product of the vacuum distillation of lubricating oils. In general, microcrystalline waxes contain only very minor quantities of straight chain paraffinic hydrocarbons and have melting points in the range of from about 145° to about 190° F. While I believe the term "microcrystalline wax" is well understood in the wax art, for additional information concerning the properties and preparation of microcrystalline waxes, I refer to U.S. Pat. No. 2,983,664 by Concetto T. Camilli.

When the coated article is to be stored in hotter climates, the coating must be able to withstand temperatures up to about 150° F. Such usage requires a wax having a melting point of at least about 160° F. when the coated article does not have to withstand such high temperatures a wax having a lower melting point is suitable; the limitation being that the dropping point is a few degrees above the maximum temperature reached during storing or transporting. In view of the foregoing discussion, lower melting point waxes (e.g., at least 140° F.) are suitable for usage where the ambient storage conditions do not exceed 135° F. Preferably, the wax has a melting point of at least 160° F. in order that the composition be able to withstand an ambient temperature of 150° F.

Microcrystalline waxes are preferred in my invention since in general they have higher melting points.

Ethylene-isobutyl acrylate copolymers are prepared by copolymerizing a mixture of ethylene and isobutyl acrylate in the presence of a free radical catalyst, e.g., tertiary butyl hydroperoxide, in a suitable reactor at elevated temperatures and pressures. The copolymers are usually identified by a combination of the ratio of comonomer present in the product and by the melt index. The test for determining melt index (ASTM D1238–57T) consists of determining the amount in grams (melt index value) of the copolymer that can be pressed through a standard orifice in ten minutes at 190° C. with a piston weighing 2160 grams. Suitable ethylene-isobutyl acrylate copolymers for use in my invention contain about 20 to about 32 weight percent isobutyl acrylate and have a melt index of about 0.5 to about 260.

Particularly suitable ethylene-isobutyl acrylate copolymers have been available from The Dow Chemical Company under the trademark "Zetafax." Physical properties of particularly suitable ethylene-isobutyl acrylate copolymers are shown in the table below.

|  | Zetafax 1278 | Copolymer Zetafax 1370 | Zetafax 1375 |
|---|---|---|---|
| Isobutyl acrylate content (percent by weight) | 18–22 | 28–32 | 28–32 |
| Physical property: |  |  |  |
| Melt index | 240–260 | 2–3 | 20 |
| Solution viscosity, cps.[1] | 0.065 | 0.116 | 0.081 |
| Density, gm./cc. | 0.926 | 0.925 | 0.923 |
| Bulk density, gm./cc. | 0.48 | 0.48 | 0.48 |
| Tensile, p.s.i. | 610 | 1,290 | 920 |
| Elongation, percent | 640 | 770 | 825 |
| Yield strength, p.s.i. | 450 | 257 | 345 |
| Hardness, Shore "D" | 30 | 26 | 28 |
| Vicat softening point, ° F. | 105 | 100 | 104 |
| Low temperature flexibility, ° C. | −45 | −70 | −70 |

[1] 0.1 gm./100 ml. decahydronaphthalene at 135° C.

Preferred ethylene-isobutyl acrylate copolymers contain from about 28 to about 32 weight percent isobutyl acrylate and have a melt index in the range of about 2 to about 20. For example, copolymers having properties such as Zetafax 1370 and Zetafax 1375 in the above-shown table are preferred.

The preparation of ethylene-ethyl acrylate copolymers is similar to that for ethylene-isobutyl acrylate copolymers. Suitable ethylene-ethyl acrylate copolymers contain from about 15 to about 32 weight percent ethyl acrylate and have melt indexes of from about 5 to about 35. Particularly suitable ethylene-ethyl acrylate copolymers contain from about 17 to about 19 weight percent ethyl acrylate and have melt indexes of from about 5 to about 25. Preferred ethylene-ethyl acrylate copolymers contain from about 17 to about 19 weight percent ethyl acrylate and have melt indexes of from about 18 to about 25.

Ethylene-ethyl acrylate copolymers are available from Union Carbide Corp. under the trade names "DPD," "DPDQ," and "DPDA." Composition and physical properties of various suitable ethylene-ethyl acrylate copolymers, which are available from Union Carbide Corp., are shown below.

|  | DPD-6169 | DPD-9169 |
|---|---|---|
| Ethyl acrylate, percent by weight | 18 | 18 |
| Ethylene, percent by weight | 82 | 82 |
| Melt index, grams/10 minutes [1] | 6 | 20 |
| Density [2] | 0.931 | 0.931 |
| Tensile strength, p.s.i.[3] | 1,350 | 1,000 |
| Inherent viscosity at 30° C. (0.25% by weight in toluene) | | 0.78 |
| Softening point, ring and ball, °F | | 240 |

[1] ASTM D-1238-57T at 44 p.s.i. at 190° C.
[2] ASTM D-1505-57T.
[3] ASTM D-412 using Die A, at a crosshead speed of 1 inch/minute until yield, then 20 inches/minute.

I have found that a composition comprising wax and an ethylene-ethyl acrylate copolymer gives superior results when used as a strippable coating. The composition has excellent stripping, storage and stress fracture properties. This particular aspect of my invention contains the following:

|  | Parts by weight | |
|---|---|---|
|  | Suitable | Preferred |
| Petroleum wax | 40-60 | 45-55 |
| Ethylene-ethyl acrylate copolymers having a melt index of 5 to 35 [1] | 60-40 | 55-45 |

[1] As described in column 4.

Compositions containing wax and a mixture of high melt index (18 to 25) and low melt index (about 6 ethylene-ethyl acrylate copolymers are also satisfactory to provide strippable coatings. The copolymer mixture gives outstanding stress fracture properties and excellent stripping properties but is deficient in high temperature storage qualities. In areas of use where stress fracture is more important than high temperature storage, these compositions may be preferred.

I have also found that the ethylene-ethyl acrylate copolymer can be used in combination with ethylene-isobutyl acrylate copolymer in wax to provide compositions having good to excellent properties as a strippable coating. The high melt index ethylene-ethyl acrylate copolymer can be used in any amount with the ethylene-isobutyl acrylate copolymer. The incorporation of the ethylene-ethyl acrylate copolymer in the composition improves the stress fracture. The low melt index ethylene-ethyl acrylate copolymer can be used in minor amounts in combination with ethylene-isobutyl acrylate copolymers in wax to provide compositions suitable for use as strippable coatings. The amounts will be shown below.

In summary then, in addition to the composition described above, the following compositions are suitable to provide strippable coatings.

|  | Parts by weight | |
|---|---|---|
| Composition A | Suitable | Preferred |
| Petroleum wax | 40-60 | 45-55 |
| E/IBA copolymer [1] | 1-59 | 1-54 |
| High melt index E/EA copolymer [2] | 1-59 | 1-54 |

[1] Ethylene-isobutyl acrylate copolymer.
[2] Ethylene-ethyl acrylate copolymer containing 17 to 19 weight percent ethyl acrylate and having a melt index of from 18 to 25.

|  | Parts by weight | |
|---|---|---|
| Composition B | Suitable | Preferred |
| Petroleum wax | 40-60 | 45-55 |
| E/IBA copolymer | 1-59 | 1-54 |
| Low melt index E/EA copolymer [1] | 1-35 | 1-30 |

[1] Ethylene-ethyl acrylate copolymer containing 17 to 19 weight percent ethyl acrylate and having a melt index of about 6.

|  | Parts by weight | | |
|---|---|---|---|
| Composition C | Suitable | Preferred | Most preferred |
| Petroleum wax | 40-60 | 45-55 | 45-55 |
| High melt index E/EA copolymer [1] | 1-59 | 5-54 | 15-20 |
| Low melt index E/EA copolymer [2] | 1-35 | 5-30 | 15-20 |

[1] Ethylene-ethyl acrylate copolymer containing 17 to 19 weight percent ethyl acrylate and having a melt index of from 18 to 25.
[2] Ethylene-ethyl acrylate copolymer containing 17 to 19 weight percent ethyl acrylate and having a melt index of about 6.

Examples of varying compositions falling within the scope of my invention include the following:

Composition A:
  Paraffin wax having an ASTM melting point of at least 145° F.
  Zetafax 1375
  DPD 9169
Composition B:
  Paraffin wax having an ASTM melting point of at least 145° F.
  Zetafax 1370
  DPD 9169
Composition C:
  Paraffin wax having an ASTM melting point of at least 145° F.
  DPD 9169
  DPD 6169
Composition D:
  Microcrystalline wax having a melting point of at least 175° F.
  Zetafax 1375
  DPD 6169
Composition E:
  Microcrystalline wax having a melting point of at least 175° F.
  Zetafax 1370
  DPD 9169
Composition F:
  Microcrystalline wax having a melting point of at least 175° F.
  DPD 9169
  DPD 6169

When used as a strippable coating the composition of my invention can be applied to the substrate in a variety of ways. A particularly suitable means of applying the composition is the "curtain coating" technique. In using this technique the substrate is passed through a falling film of the molten composition. The falling film resembles a curtain; hence, the name "curtain coating." This technique is well known in the coating art. Other means of applying the composition include dipping, extruding, fan spraying (no solvent is required), and solvent-cutback spraying.

The thickness of the coating applied to the substrate is an important variable and is dependent on the specific application. For example, the strength of the coating increases directly with thickness thus improving its stripping properties. A thick coating also offers more protection to the substrate than a thin coating and the degree of protection required will obviously depend upon the particulars surrounding the specific application. In my work coating thickness between about 5 and 20 mils has met the various requirements. About 15 mils is preferred for automobile molding and 5 to 7 mils for flat aluminum plate.

The degree of adhesion of the film to the substrate is proportional to the temperature at the interface of the coating and substrate at the time of application. In turn the temperature at the interface is due to the temperature of the composition and the substrate at the time of application. Assuming the substrate is at a normal ambient temperature of between 70 and 80° F., I have found a suitable curtain coating application temperature for the composition to be in the range of from about 290 to about 390° F. The exact temperature will depend upon the properties of the substrate and thickness of the coating.

As indicated hereinbefore the compositions used in my invention have been used to form strippable coatings on a variety of automotive body trim parts (referred to as "moldings" in the trade). These moldings are presently made of aluminum, anodized aluminum, painted aluminum, stainless steel, vinyl, acrylonitrile-butadiene-styrene (ABS) polymer and combinations of these materials. The moldings range in length from about 2 to 8 feet and in width from about ½ to 4 inches.

In addition to the above-described moldings the compositions described herein can be used as protective, strippable coatings on a wide variety of articles of manufacture. Such articles include decorative moldings, pipes, rods and sheet materials, whether of metal, plastic or wood, used in the home, furniture and building trades. These compositions can also be used to protect critical surfaces used in industry while in storage or transportation as for example die faces used in metal-forming operations. An antirust agent such as calcium sulfonate can be added to the composition if that type of protection is also required.

Previously herein, I have stated that when the coated article is to be stored in hotter climates, the coating must be able to withstand temperatures up to about 150° F. A simple test for measuring this property is to place the coated article in an oven maintained at 150° F. for a short time (16 hours or more). If the coating retains a continuous film and is strippable after cooling at ambient temperature the composition is satisfactory. Failure is indicated by the presence of one or more cracks in the film or objectionable adhesion to the coated article. One form of objectionable adhesion is defined as that which causes the coating to strip in numerous small pieces thus taking a long time to get the article stripped. Another form of objectionable adhesion is when the bulk of the coating may strip easily but some areas remain bonded tightly and require extra effort to remove.

Inasmuch as it is simpler to have a single composition to coat articles stored in all climates, the compositions which can be used at temperatures up to about 150° F. are preferred. As stated previously herein such a composition requires a higher melting point wax.

In order to disclose the nature of the present invention still more clearly, the following illustrative examples will be given. It is to be understood that the invention is not to be limited to the specific conditions or details set forth in these examples except insofar as such limitations are specified in the appended claims.

Of the following examples, Examples 1–5 are taken from the first application (Ser. No. 888,846). In order to insure complete release under all application conditions and on all types of moldings, a release agent was used in the compositions of Examples 1–5. While sorbitan monooleate was used as the release agent in Examples 1–5, other materials, e.g. those described in U.S. Pat. No. 3,207,716, are equally suitable.

The first application (Ser. No. 888,846), on page 15, made the following statement, "It should be emphasized that in many applications the compositions of my invention have excellent stripping quality without the inclusion of a release agent." Examples 6–12, which follow, and which were included in application Ser. No. 113,069, illustrate the compositions of my invention not containing a release agent.

The stress fracture property shown in the examples was measured using the following procedure. Dumbbell shaped coupons were made of the composition being tested. Metal supports were fashioned to permit hanging the coupons by one end to a stationary bar and attaching a weight to the lower end. The size of the coupon and weight were selected to place the specimen under an initial static stress of 500 p.s.i., which was at least 100 p.s.i. under the yield stress of all compositions tested by conventional tensile strength methods. (The test was conducted in a constant temperature room maintained at 73° F.) The distance from the bottom of the hanging weight to the table below was equivalent to 150% of the gauge length of the test coupon. The results of the test are reported two ways in the examples. In most cases, the results are reported as the number of days under stress without fracture. In two examples the number of days are reported with the notation "NF" (No Fracture). In these examples the test specimens stretched until the weight rested upon the table and still did not break. This condition indicated that the specimens could last an indefinite (particularly long) number of days.

EXAMPLE 1

This example illustrates the preferred composition of my invention. The composition was as follows:

| | Parts by weight |
|---|---|
| DPD 9169 | 48 |
| Microcrystalline wax * | 52 |
| Sorbitan monooleate | 0.5 |

*Having an ASTM melting point of 175° F. minimum and an ASTM needle penetration at 77° F. of 16.

Using a curtain coater, the composition was applied to automobile moldings made of aluminum and vinyl-stainless steel. The coating speed was 60 feet per minute and the composition temperature was 330° F. The coating had the following properties:

| | |
|---|---|
| Stripping quality, ambient | Very good. |
| Storage quality at 150° F.: | |
|    Stripping | Pass. |
|    Cracks | Pass. |
| Stress fracture, 500 p.s.i., days to fracture | 5+. |

EXAMPLE 2

This example is comparative and shows that a wax-ethylene isobutyl acrylate composition does not give as good a stress fracture result as the blend of Example 1. The composition was as follows:

| | Parts by weight |
|---|---|
| Zetafax 1370 | 51 |
| Microcrystalline wax * | 49 |
| Sorbitan monooleate | 0.5 |

*Same as in Example 1.

Using the curtain coating method of Example 1, the composition was applied to automobile moldings made of aluminum and vinyl-stainless steel. The coating had the following properties:

| | |
|---|---|
| Stripping quality, ambient | Very good. |
| Storage quality at 150° F.: | |
|    Stripping | Good. |
|    Cracks | Pass. |
| Stress fracture, 500 p.s.i., days to fracture | 0.1. |

EXAMPLE 3

This example has two runs which show that a composition comprising wax and a blend of ethylene-ethyl acrylate copolymer having a melt index of 20 and ethylene-isobutyl acrylate copolymer gives superior resistance to stress fracture as compared to a composition comprising wax and ethylene-isobutyl acrylate copolymer (shown in Example 2). The compositions were as follows:

| | Parts by weight | |
|---|---|---|
| | A | B |
| Microcrystalline wax [1] | 50 | 50 |
| DPD 9169 | 10 | 20 |
| Zetafax 1375 | 40 | 30 |
| Sorbitan monooleate | 0.5 | 0.5 |

[1] Same as in Example 1.

Using the curtain coating method of Example 1, the compositions were applied to automobile moldings made of aluminum and vinyl-stainless steel. The coatings had the following properties:

|  | A | B |
|---|---|---|
| Stripping quality, ambient | Very good | Very good |
| Storage quality at 150° F.: | | |
| Stripping | Excellent | Excellent |
| Cracks | Pass | Pass |
| Stress fracture, 500 p.s.i., days to fracture | 2 | 4 |

EXAMPLE 4

This example concerns compositions comprising wax, ethylene-isobutyl acrylate copolymer and ethylene-ethyl acrylate copolymer. It shows that ethylene-ethyl acrylate copolymer having a melt index of 20 provides better resistance to stress fracture than an ethylene-ethyl acrylate copolymer having a melt index of 6. The compositions were as follows:

|  | Parts by weight | |
|---|---|---|
|  | C | D |
| Microcrystalline wax [1] | 51 | 51 |
| DPD 9169 [2] |  | 10 |
| DPD 6169 [3] | 10 |  |
| Zetafax 1375 | 39 | 39 |
| Sorbitan monooleate | 0.5 | 0.5 |

[1] Same as in Example 1.
[2] Melt index=20.
[3] Melt index=6.

Using the curtain coating method of Example 1, the compositions were applied to automobile moldings made of aluminum and vinyl-stainless steel. The coatings had the following properties:

|  | C | D |
|---|---|---|
| Stripping quality, ambient | Very good | Good |
| Storage quality at 150° F.: | | |
| Stripping | Fair | Fair |
| Cracks | Pass | Pass |
| Stress fracture, 500 p.s.i., days to fracture | 0.1 | 3 |

EXAMPLE 5

This example shows that a composition comprising wax and a blend of ethylene-ethyl acrylate copolymers (one having a melt index of 20, while the other has a melt index of 6) provides outstanding resistance to stress fracture. While the composition is deficient in 150° F. storage properties, it is suitable for use as a strippable coating where superior stress fracture resistance at normal temperature is more important than resistance to high temperature cracks. The composition was as follows:

Parts by weight
Microcrystalline wax* _____ 52
DPD 6169 _____ 24
DPD 9169 _____ 24
Sorbitan monooleate _____ 0.5

*Same as in Example 1.

Using the curtain coating method of Example 1, the composition was applied to automobile moldings made of aluminum and vinyl-stainless steel. The coating had the following properties:

Stripping quality, ambient _____ Excellent.
Storage quality at 150° F.:
    Stripping _____ Good.
    Cracks _____ Fail.
Stress fracture, 500 p.s.i., days to fracture _ More than 10.

EXAMPLE 6

This example shows that a composition consisting essentially of wax and a blend of ethylene-ethyl acrylate copolymers (one having a melt index of 20, while the other has a melt index of 6) provides outstanding resistance to stress fracture. While the composition is deficient in 150° F. storage properties, it is suitable for use as a strippable coating where superior stress fracture resistance at normal temperature is more important than resistance to high temperature cracks. The composition was as follows:

Parts by weight
Microcrystalline wax* _____ 52
DPD 9169 _____ 24
DPD 6169 _____ 24

*Same as in Example 1.

Using the curtain coating method of Example 1, the composition was applied to automobile moldings made of aluminum and vinyl-stainless steel. The coating had the following properties:

Stripping quality, ambient _____ Very good.
Storage quality at 150° F.:
    Stripping _____ Fair.
    Cracks _____ Fail.
Stress fracture, 500 p.s.i., days to fracture _ More than 10.

EXAMPLE 7

This example shows the results on a composition similar to that of Example 6 in that the composition consisted essentially of wax and a blend of ethylene-ethyl acrylate copolymers. The composition differed from that in Example 6 in the amounts of the various ethylene-ethyl acrylate copolymers present in the composition. This composition provided very good resistance to stress fracture and had excellent stripping quality. However, it had some deficiencies in 150° F. storage properties. The composition was as follows:

Parts by weight
Microcrystalline wax* _____ 52
DPD 9169 _____ 38
DPD 6169 _____ 10

*Same as in Example 1.

Using the curtain coating method of Example 1, the composition was applied to automobile moldings made of aluminum and vinyl-stainless steel. The coating had the following properties:

Stripping quality, ambient _____ Excellent.
Storage quality at 150° F.:
    Stripping _____ Difficult.
    Cracks _____ Fail.
Stress fracture, 500 p.s.i., days to fracture ___ NF (8).

EXAMPLE 8

This example shows the results of a comopsition which was very similar to that used in Example 7. Again, the composition provided good resistance to stress fracture and good stripping quality, but had some deficiencies in 150° F. storage properties. The composition was as follows:

Parts by weight
Microcrystalline wax* _____ 53
DPD 9169 _____ 38
DPD 6169 _____ 9

*Same as in Example 1.

Using the curtain coating method of Example 1, the composition was applied to automobile moldings made of aluminum and vinyl-stainless steel. The coating had the following properties:

Stripping quality, ambient _____ Good.
Storage quality at 150° F.:
    Stripping _____ Difficult.
    Cracks _____ Fail.
Stress fracture, 500 p.s.i., days to fracture____ NF (5).

EXAMPLE 9

This example shows the results of a composition consisting essentially of microcrystalline wax and an ethylene-ethyl acrylate copolymer having a melt index of 20. The composition provided excellent resistance to stress fracture; however, the stripping quality was not as good as that of the compositions used in Examples 6–8. The storage quality was better than in the composition used in Examples 6–8. The composition was as follows:

| | Parts by weight |
|---|---|
| Microcrystalline wax* | 52 |
| DPD 9169 | 48 |

*Same as in Example 1.

Using the curtain coating method of Example 1, the composition was applied to automobile moldings made of aluminum and vinyl-stainless steel. The coating had the following properties:

Stripping quality, ambient _____ Fair.
Storage quality at 150° F.:
    Stripping _____ Fair.
    Cracks _____ Pass.
Stress fracture, 500 p.s.i., days to fracture _____ 6+.

EXAMPLE 10

This example shows the results on a composition consisting essentially of microcrystalline wax, an ethylene-ethyl acrylate copolymer having a melt index of 20 and an ethylene-isobutyl acrylate copolymer. The composition provided excellent high temperature storage qualities and good stripping qualities at ambient temperature. The composition was as follows:

| | Parts by weight |
|---|---|
| Microcrystalline wax* | 50 |
| DPD 9169 | 20 |
| Zetafax 1375 | 30 |

*Same as in Example 1.

Using the curtain coating method of Example 1, the composition was applied to automobile moldings made of aluminum and vinyl-stainless steel. The coating had the following properties:

Stripping quality, ambient _____ Good.
Storage quality at 150° F.:
    Stripping _____ Excellent.
    Cracks _____ Pass.
Stress fracture, 500 p.s.i., days to fracture __ Did not test.

EXAMPLE 11

This example shows the results on a composition consisting essentially of microcrystalline wax, an ethylene-ethyl acrylate copolymer having a melt index of 6 and an ethylene-isobutyl acrylate copolymer. The composition had good stripping qualities at ambient temperatures, poor stress fracture properties and good storage qualities at 150° F. The composition was as follows:

| | Parts by weight |
|---|---|
| Microcrystalline wax* | 51 |
| DPD 6169 | 10 |
| Zetafax 1375 | 39 |

*Same as in Example 1.

Using the curtain coating method of Example 1, the composition was applied to automobile moldings made of aluminum and vinyl-stainless steel. The coating had the following properties:

Stripping quality, ambient _____ Good.
Storage quality at 150° F.:
    Stripping _____ Fair.
    Cracks _____ Pass.
Stress fracture, 500 p.s.i., day to fracture _____ 0.5.

EXAMPLE 12

This example shows the results on a composition consisting essentially of microcrystalline wax, an ethylene-ethyl acrylate copolymer having a melt index of 20 and ethylene-isobutyl acrylate copolymers. The composition provided very good stripping qualities at ambient temperature, fairly good stress fracture properties, and very good storage qualities at 150° F. The composition was as follows:

| | Parts by weight |
|---|---|
| Microcrystalline wax* | 51 |
| DPD 9169 | 10 |
| Zetafax 1375 | 39 |

Using the curtain coating method of Example 1, the composition was applied to automobile moldings made of aluminum and vinyl-stainless steel. The coating had the following properties:

Stripping quality, ambient _____ Very good.
Storage quality at 150° F.:
    Stripping _____ Fair.
    Cracks _____ Pass.
Stress fracture, 500 p.s.i., days to fracture ___ 3.

We have stated in the foregoing that the compositions described herein can be used on a wide variety of substrates, such as automobile moldings, decorative moldings, pipes, rods and sheets of materials. These substrates can be made of various metals, plastics and wood and combinations of metals, plastics and wood. By combination is meant that one part of the substrate can be of one metal, the adjacent part of plastic, and the second adjacent part of wood. Having described that the compositions described can be used to form readily strippable coatings on various articles, the nature of the article to be coated can be readily determined by anyone skilled in this art.

The invention having thus been described, what is claimed and desired to be secured by Letters Patent is:

1. As an article of manufacture, a substrate having a readily strippable coating of a composition not containing a release agent and consisting essentially of from about 40 to about 60 parts by wegiht petroleum wax and from about 60 to about 40 parts by weight of a mixture of ethylene-ethyl acrylate copolymers containing from about 17 to about 19 weight percent ethyl acrylate, one of said copolymers having a melt index of from about 5 to about 7 and the second of said copolymers having a melt index of from about 18 to about 25, said article of manufacture being characterized further in that the substrate is made of metal, plastic, wood or various combinations of these materials.

2. The article of manufacture of claim 1 wherein one of said ethylene-ethyl acrylate copolymers has a melt index of about 6 and the second of said copolymers has a melt index of about 20.

3. The article of manufacture of claim 2 wherein the petroleum wax is a microcrystalline wax having melting point of at least 160° F.

References Cited

UNITED STATES PATENTS

| 3,489,705 | 1/1970 | Zmitrovis | 260—28.5 AV |
| 3,386,936 | 6/1968 | Gordy | 260—28.5 AV |
| 3,362,839 | 1/1968 | Weindel | 260—28.5 AV |
| 3,487,036 | 12/1969 | Bissot | 260—28.5 AV |
| 3,502,764 | 3/1970 | Tordella | 260—28.5 AV |
| 3,422,551 | 1/1969 | Blank | 260—28.5 AV |

MORRIS LIEBMAN, Primary Examiner

P. R. MICHL, Assistant Examiner

U.S. Cl. X.R.

260—28.5 AV